Oct. 20, 1936.　　　T. BROWN　　　2,057,935
TRACTOR
Filed June 17, 1935　　　6 Sheets-Sheet 1
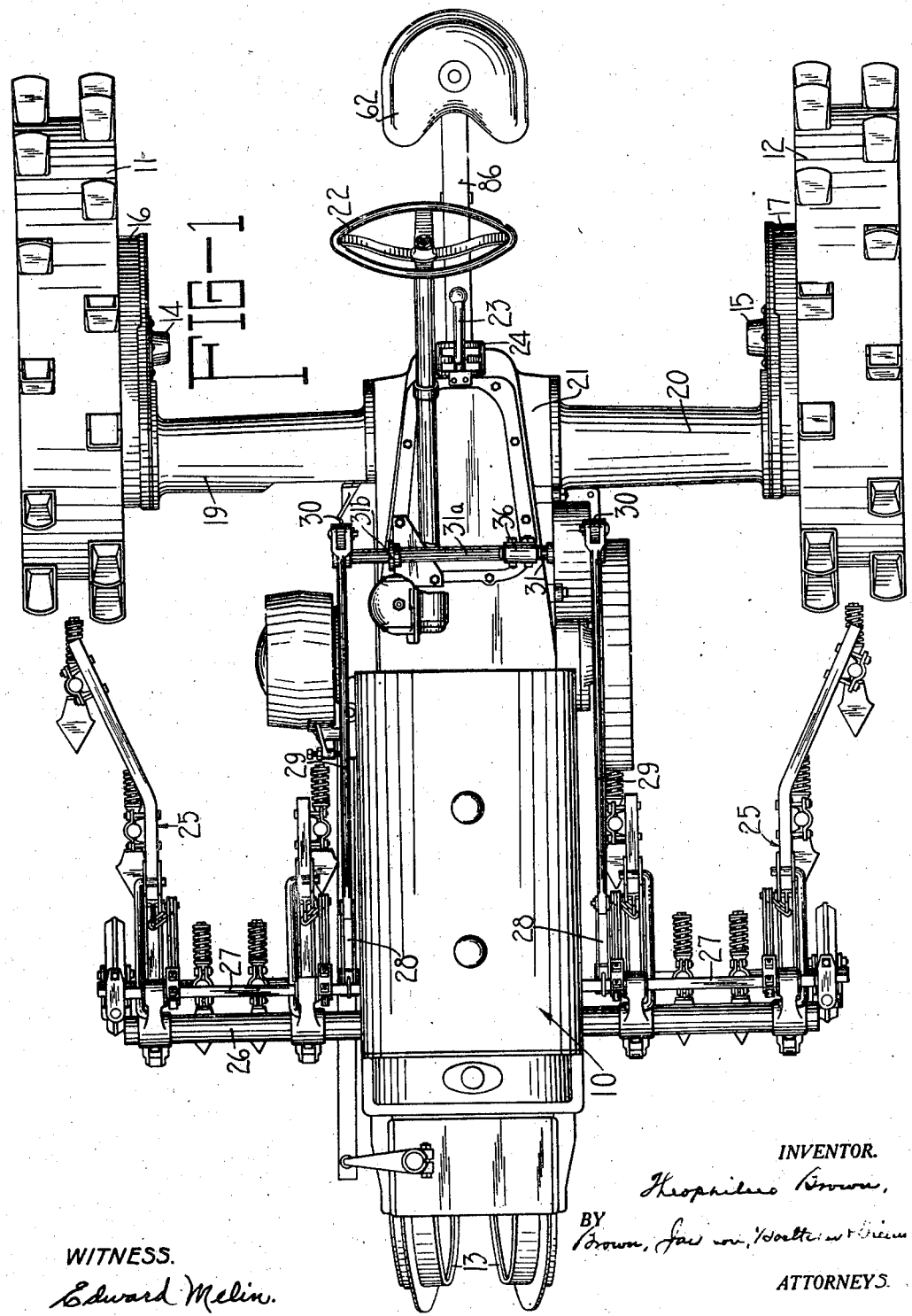
WITNESS.
Edward Melin.
INVENTOR.
Theophilus Brown,
BY
Brown, Jackson, Boettcher & Dienner
ATTORNEYS.

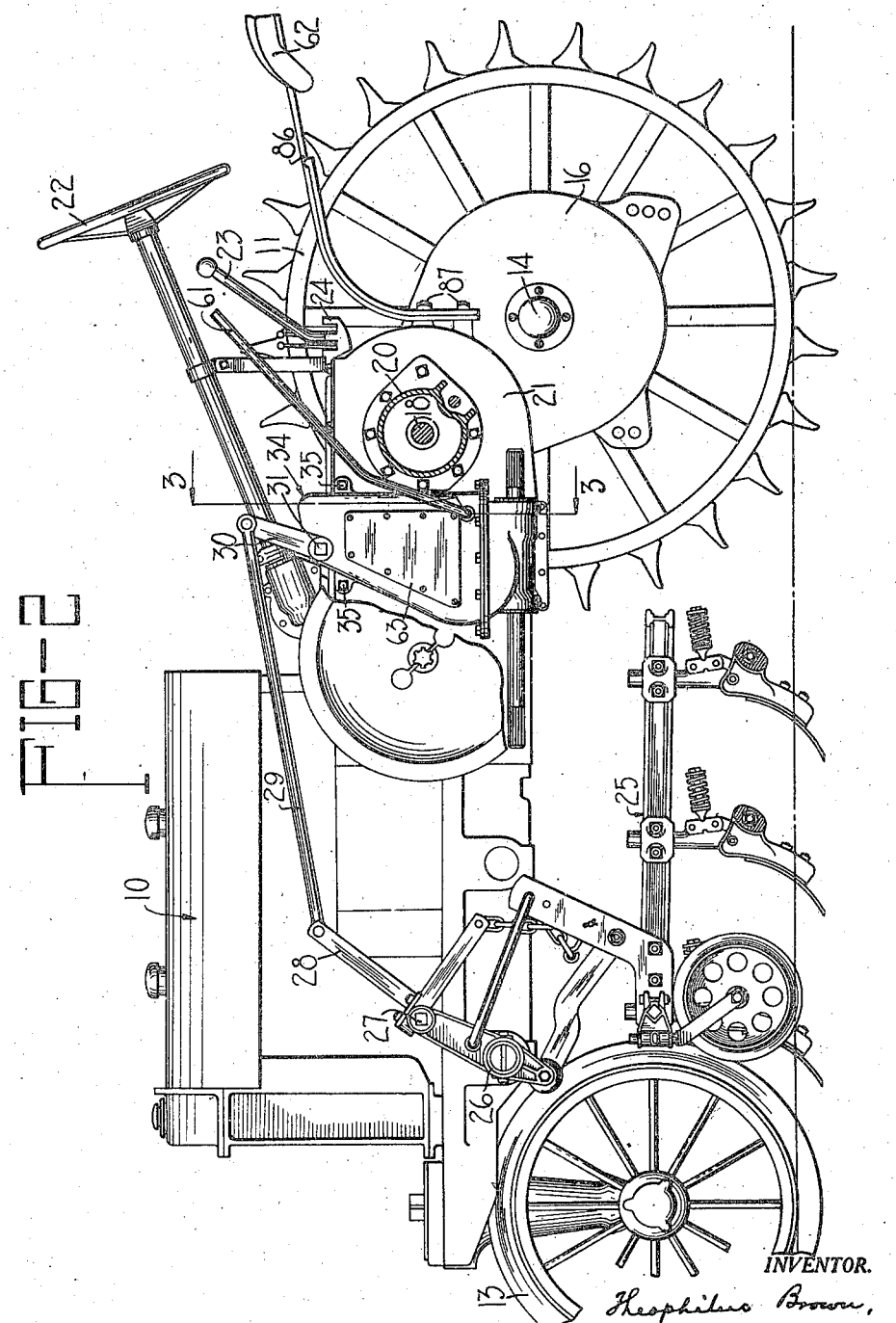

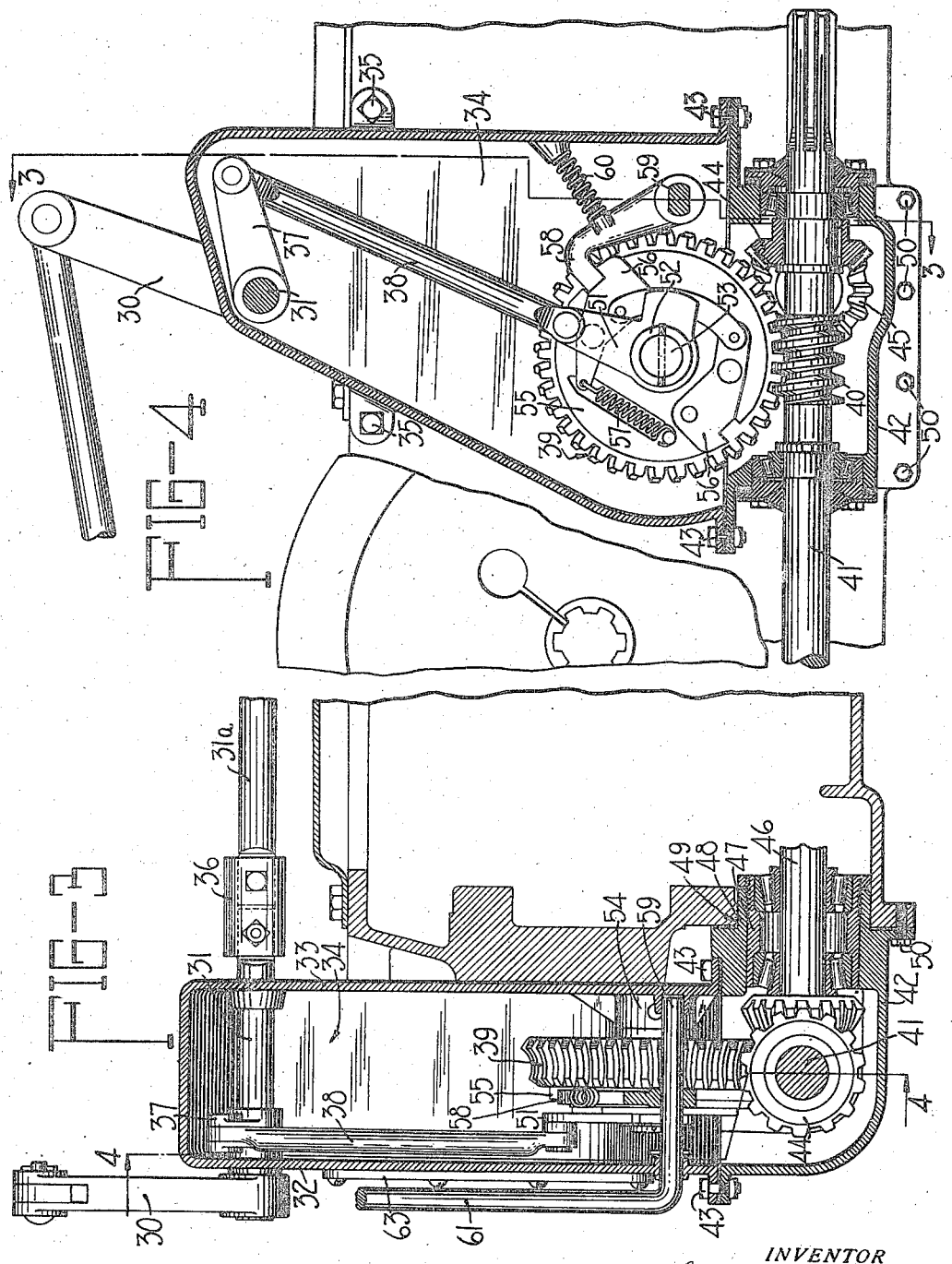

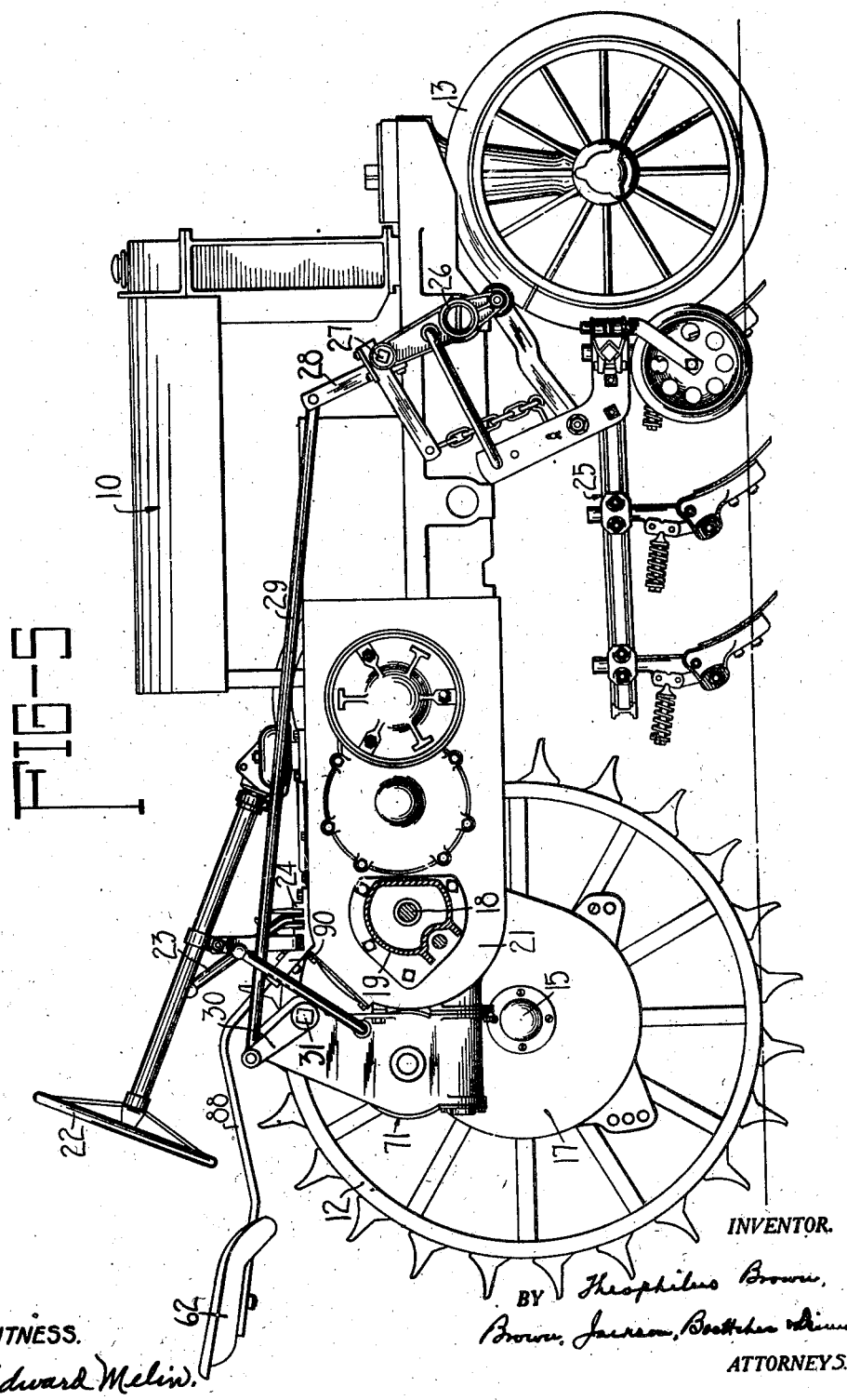

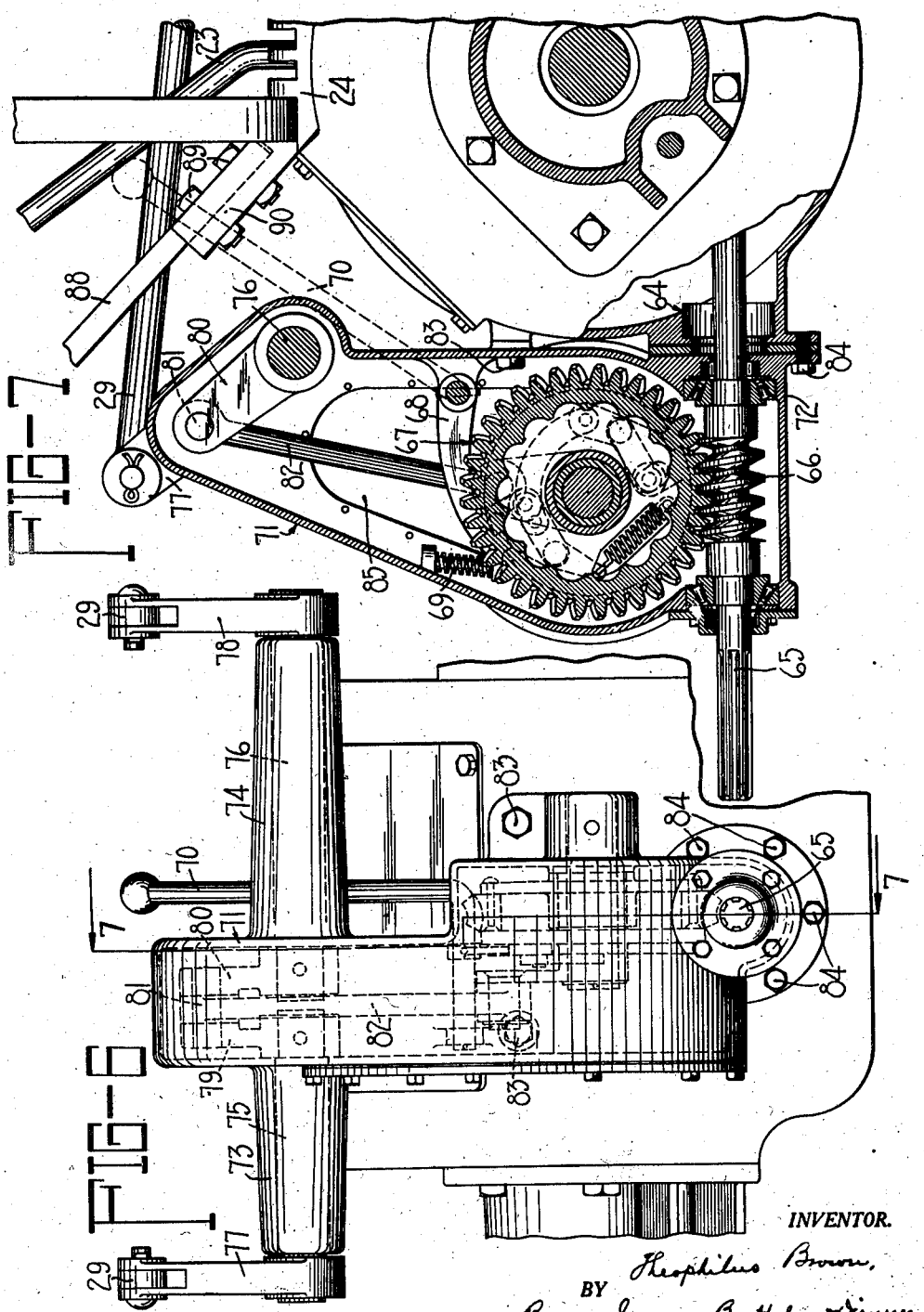

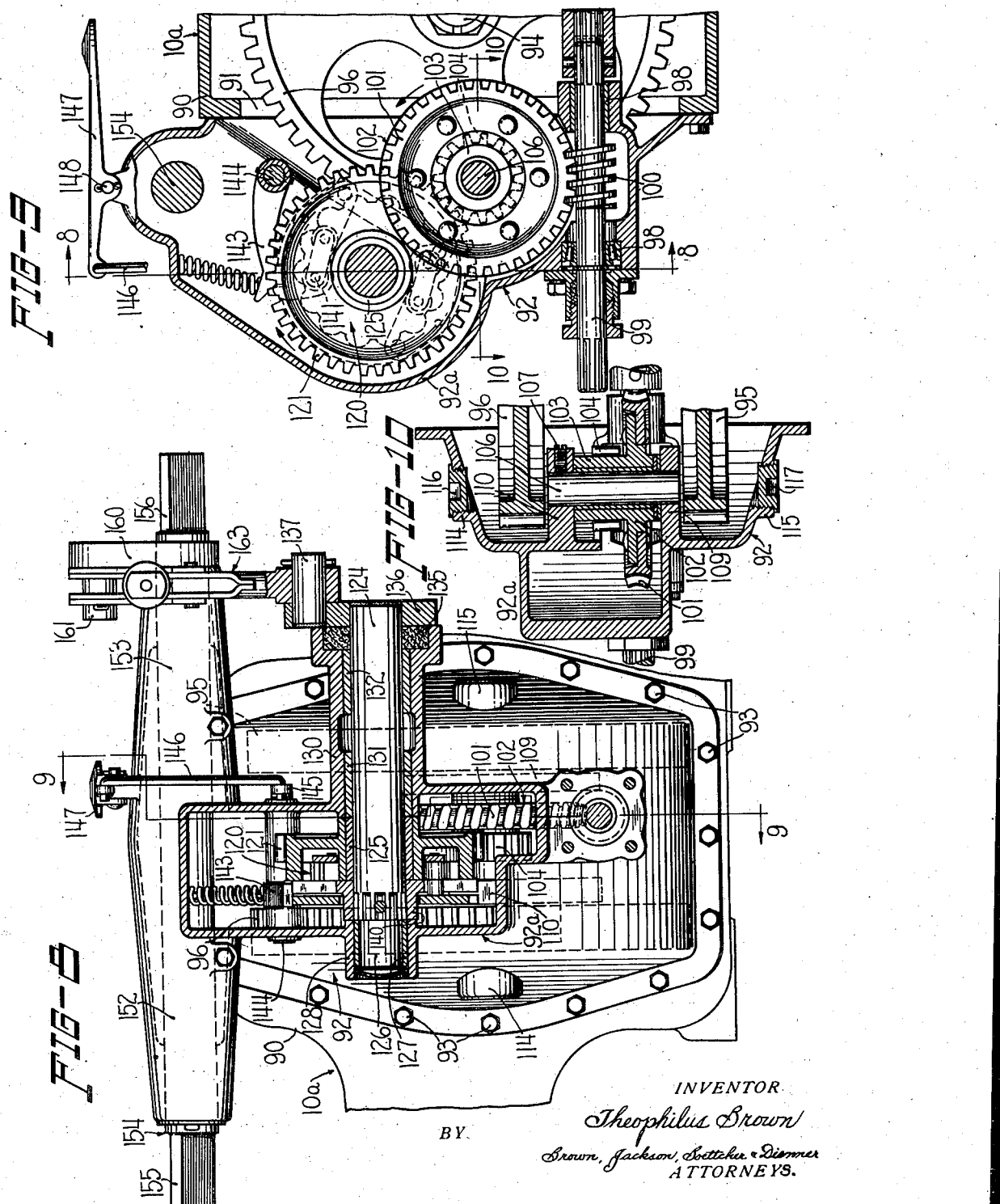

Patented Oct. 20, 1936

2,057,935

UNITED STATES PATENT OFFICE 2,057,935

TRACTOR

Theophilus Brown, Moline, Ill., assignor to John Deere Tractor Company, Waterloo, Iowa, a corporation of Iowa Application June 17, 1935, Serial No. 27,060

25 Claims. (Cl. 97—50)

REISSUED

This application is a continuation in part of my copending application Serial No. 653,067, filed January 23, 1933.

This invention has to do with tractors of the type commonly used to propel agricultural implements of various sorts, such as plows, cultivators, planters, harvesters, etc. In some instances the implement is arranged to be attached at the forward portion of the tractor, and in others at the rear portion thereof, but so far as my present invention is concerned it may be employed with either arrangement.

Where the implement associated with the tractor has operating parts that are required to be driven—as in harvesters of various kinds, mowers, and the like,—or where it has parts that must be raised or lowered—as in the case of plows, cultivators and like implements,—it has heretofore been proposed to employ power derived from the tractor—generally from the motor by which the tractor is itself driven—to effect the desired operation of such implement parts. To this end it is common practice to equip the tractor with a power take-off shaft mounted in a suitable housing adapted to be applied to the tractor body or frame, either at the side or at the rear thereof, according to the preference of the designer.

Heretofore, in equipping tractors with means for utilizing the power of the tractor motor to raise or lower the operating parts of the implement, it has been the practice to provide an actuating rock shaft mounted upon the tractor frame, or otherwise supported by it, by the rocking of which the implements are raised or lowered through suitable operating connections, and provision has been made for rocking such rock shaft at the option of the operator through intermittently operable clutch mechanism mounted on the tractor and arranged to be driven from the tractor motor. A construction of this kind in which an actuating rock shaft, mounted on the rear portion of the tractor frame, is rocked by the operation of half-revolution clutch mechanism attached at the rear of such frame and driven from the tractor motor through a rearwardly extending power take-off shaft, is shown in Letters Patent No. 1,872,237, granted to me August 16, 1932. In such construction, however, the rock shaft is mounted on the tractor frame separately from the power lift operating devices, and consequently separate provision must be made for so supporting it.

My present invention has for its primary object the provision of power lift mechanism adapted to be applied as a unit to a farm tractor for raising or lowering the implements operated thereby by power from the tractor motor, whether they be located at the front or at the rear of the tractor, such unit being complete in itself so far as the operating power lift elements, including the actuating rock shaft, or its equivalent, are concerned, so that it may readily be applied to a tractor, whether at the side or at the rear thereof, by simply attaching it to the tractor frame or body over the opening usually provided for giving access to the interior of the gear case or the differential housing, in accordance with the practice above mentioned. For many years it has been customary to provide either the gear case or the rear axle housing of tractors with such an opening, which is generally closed by a removable cover plate, and my improved attachment may conveniently be applied in a similar manner. So far as I am aware, no one has heretofore proposed to include the rock shaft referred to as a part of a unitary power lift attachment that includes also the power lift actuating devices, and is arranged to be unitarily applied to or removed from the side portion or the rear portion of a farm tractor, and this is a salient characteristic of my present invention. This unitary arrangement is advantageous not only because it greatly facilitates the application of the power lift mechanism to, or its removal from the tractor, but also because it insures that the operating parts of such mechanism, including the rock shaft and the connections for actuating it properly, will not become disarranged by the removal or replacement of the attachment. In the accompanying drawings I have illustrated three ways in which my invention may be embodied, one of the forms shown being adapted for application to the side portion of the tractor frame or body, and the other two for application at the rear thereof. In any case the power lift mechanism, including the rock shaft, may readily be applied to or removed from the tractor without disturbing its operating mechanism or the implements connected therewith.

In the accompanying drawings,

Figure 1 is a plan view of a well-known commercial farm tractor, equipped with cultivator rigs connected with a draft member at the forward portion thereof, having my improved power lift attachment applied thereto at the side of the tractor frame adjacent to the read end thereof;

Figure 2 is a side elevation of the parts shown in Figure 1, one rear wheel being removed and one of the parts or quills of the rear axle housing being shown in section;

Figure 3 is an enlarged detail, being a vertical cross-section on line 3—3 of Figures 2 and 4, illustrating my improved power lift attachment;

Figure 4 is a longitudinal vertical section on line 4—4 of Figure 3;

Figure 5 is a side elevation illustrating the application of my invention to a tractor in which the power take-off shaft extends through an opening at the rear of the tractor frame or gear case, in this case the attachment being applied at the rear instead of at the side of the tractor frame;

Figure 6 is an enlarged detail, being a partial rear elevation of the arrangement shown in Figure 5;

Figure 7 is a longitudinal vertical section on line 7—7 of Figure 6;

Figure 8 is a section taken along the line 8—8 of Figure 9 and illustrates a third form of construction embodying the principles of the present invention;

Figure 9 is a central section taken along the line 9—9 of Figure 8; and

Figure 10 is a horizontal section taken along the line 10—10 of Figure 9.

I have chosen to illustrate my invention as applied to a tractor in which the crank case and housing for the change speed gearing and the differential gearing constitute the body or frame of the tractor, but it is to be understood that my invention may be applied to tractors in which there is a separate frame which supports the operating parts and the housings therefor, since the particular construction of the tractor forms no part of my invention, aside from the fact that provision must be made for taking off power from the driving mechanism of the tractor, preferably at a point that will permit the power take-off shaft, or its equivalent, to be driven independently of the driving of the propelling ground wheels of the tractor, as is well known in the art.

Referring now to Figures 1 to 4, the reference numeral 10 indicates the tractor as a whole, which is provided with rear drive wheels 11, 12 and one or more front steering wheels 13. The tractor illustrated is of the so-called tricycle type in which there are usually two front steering wheels set close together to operate as one, but obviously there could be two widely spaced front steering wheels, as is common practice. The rear wheels 11, 12 are mounted on stub axles 14, 15 carried by housing 16, 17, at the ends of transversely extending jack-shafts 18 enclosed in tubular housings or quills 19, 20 that extend from opposite sides of the central portion 21 of the tractor body. The jack-shafts 18 are connected with the tractor motor through suitable differential gearing contained within the tractor body 21, and they operate to drive the wheels 11, 12 through chain and sprocket gearing contained within the housings 16, 17. The purpose of this well-known arrangement is to provide what is, in effect, an arched rear axle, to adapt the tractor for use in cultivating operations, but it is to be understood that my invention may be applied to a tractor in which the rear wheels are mounted on a straight rear axle, rather than on an arched one, in which case the design of the rear axle housing would be appropriately altered.

The tractor is equipped with the usual control devices, such as a steering wheel 22 for steering the front wheels 13 and a gear shift lever 23 operating in the usual H-type bracket 24 for shifting gears. These parts are of conventional design and need not be described.

As has been said, the tractor illustrated is equipped with cultivator rigs 25 which are connected to a transverse draft beam 26, preferably tubular in form, that is connected with the forward portion of the tractor and extends at opposite sides thereof, as best shown in Figure 1. The rigs are arranged to be raised or lowered by the rocking of a rock shaft 27 which is also mounted on the forward portion of the tractor and extends at opposite sides thereof parallel with the draft beam 26. This rock shaft may either be a continuous one that extends at both sides of the tractor, or it may be made in separate parts, one mounted at each side of the tractor. In Figure 2 the connections by which the rocking of the rock shaft 27 to raise or lower the rigs are shown, but as such connections may be varied at the option of the manufacturer and their particular construction constitutes no part of my present invention, they need not be described.

The rock shaft 27 is provided with connections for rocking it from the rear portion of the tractor, such connections comprising an arm 28 fixedly connected therewith and, in this instance, extending upwardly therefrom, and a connecting rod 29 that extends rearwardly from the arm 28 at one side of the tractor. Where the rock shafts 27 are made separate, each of the members thereof is provided with an arm 28 and a connecting rod 29, as shown in Figure 1. If desired, even where the rock shaft 27 is continuous, the two arms 28 and connecting rods 29 may be employed, so that power may be applied equally to both end portions of said rock shaft.

The rear end portions of the connecting rods 29, where two are provided, are connected to arms 30 secured to the opposite end portions of power lift means in the form of an actuating rock shaft 31 that is part of the power lift mechanism considered as a whole. As shown in Figure 3, this actuating rock shaft or power lift means is mounted in suitable bearings in the side members 32, 33 of a suitable housing 34 that is adapted to be applied to the side portion of the tractor body and to be removably secured thereto by bolts 35 shown in Figure 2. Where the rock shaft 27 is continuous and it is not desired to provide two arms 28 and connecting rods 29, the portion 31a of the rock shaft 31 that extends to the opposite side of the tractor body may be omitted, for which purpose a coupling 36 outside the housing 34 is provided. The portion 31a, when used, is preferably journaled in a bearing 31b on the tractor body. Obviously said rock shaft may also be connected to raise or lower implements at the rear of the tractor, if desired.

Within the housing 34 the actuating rock shaft 31 is provided with an arm 37 fixedly secured thereto, to which arm is connected a pitman 38 by the reciprocation of which the rock shaft 31 may be rocked.

In the construction illustrated, the pitman 38 is adapted to be actuated by power derived from the tractor motor through a suitably driven power take-off shaft and optionally operated half revolution clutch mechanism of the type commonly used for power lift purposes on agricultural implements of various sorts, but it is to be understood that my present invention is not limited to the use of such half revolution clutch mechanism for operating the actuating rock shaft, as any other suitable power lift actuating mechanism or means for transmitting power from the power take-off shaft to the actuating rock shaft may be employed, provided it be such that it, together with the actuating rock shaft, may be applied to or removed from the tractor as a unit.

The arrangement of the power take-off shaft, and the construction of the half revolution clutch mechanism illustrated in Figures 3 and 4 is in all essential respects like that shown and described in the letters patent issued to myself and L. A. Murray, No. 1,933,539, dated November 7, 1933, and the manner in which the attachment is applied to the tractor body is also substantially the same, so that it is believed to be unnecessary to describe such parts here in detail. It will suffice to say that the clutch mechanism shown comprises a worm wheel 39 that is constantly driven by a worm 40 on a power take-off shaft 41 mounted in suitable anti-friction bearings in a housing member 42 that is adapted to be connected to the lower portion of the housing 34, these parts being connected by bolts 43. The shaft 41 extends longitudinally of the tractor and preferably its ends project out of the housing member 42 forwardly and rearwardly so that connection may be made to either or both ends for taking off power therefrom to operate implements connected with the front or rear portions of the tractor. The shaft 41 is provided with a bevel pinion 44 which meshes with a bevel pinion 45 carried by a transverse shaft 46 mounted in suitable anti-friction bearings carried by a sleeve 47 that is fitted in a tubular extension 48 in the housing member 42. This extension member 48 is adapted to fit into the usual opening 49 provided at the side of the body of certain well-known tractors near the rear portion thereof, for giving access to the interior of the gear case. Bolts 50 secure the housing member 42 in position, and also serve to further secure the housing 34 in place. The shaft 46 is arranged to be driven in any suitable way from the power plant of the tractor, as for example by the connections shown and described in said Brown and Murray patent, or by connections to the transmission mechanism as described in the Sunboom Patent No. 1,514,876, dated November 11, 1924. However, any other suitable connections such as are commonly employed for driving a power take-off shaft may be employed.

The pitman 38 is actuated to rock the actuating rock shaft 31 by means of a crank 51 that is provided with a hub 52 journaled on a stub axle 53 which is anchored in a boss 54 that is carried by the housing 34, as best shown in Figure 3. The worm wheel 39 is journaled on the hub 52 so that normally it may rotate freely thereon. At one side of said worm wheel is a driven clutch member 55 that is adapted to be interlocked with said worm wheel, to cause it to rotate in unison therewith, by the operation of suitable dogs 56 pivoted on said driven clutch member and tending to rock into operative position under the influence of a spring 57, shown in Figure 4. These dogs are normally held in retracted or inoperative position by a pawl 58 mounted on a rock shaft 59 carried by the housing 34 and pressed inwardly by a spring 60, also shown in said figure. The shaft 59 is rocked manually, to move the pawl 58 out of operative position, by a tripping lever 61 mounted at its lower end portion in the housing 34, as shown in Figure 3, which extends to a position convenient to the driver's seat 62. These parts operate in the usual way to interlock the driven clutch member 55 with the worm wheel 39, which is the driving clutch member, whenever the operator moves the pawl 58 away from its normal position and thereby releases the dogs 56 to enable them to effect the interlocking of the clutch members. The operator momentarily operates the pawl 58 to effect such interlock and then releases it, whereupon, when the clutch members complete one-half of a revolution, the pawl 58 moves the dogs 56 out of operative position, which stops the driven clutch member 55 and holds it against further rotation. This semi-rotation of the driven clutch member will move the pitman 38 in one direction or the other and, consequently, will rock the actuating rock shaft 31 correspondingly to raise or lower the implement tools, as the case may be. Thus the pitman 38 constitutes an operating connection between the power lift means or rock shaft 31 and the power lift actuating mechanism which, in the illustrated construction, is the half revolution clutch mechanism.

From the foregoing description it will be seen that inasmuch as the half revolution clutch mechanism, the actuating rock shaft 31, the pitman 38, and the tripping lever 61 are mounted as a unit in the housing 34, they may be applied to or removed from the tractor body as a unit, either along with the power take-off shaft 41 and its driving connections, or separately therefrom, since by disconnecting the bolts 35 and 43 the housing 34 may be separately removed without disturbing the housing member 42. By removing the bolts 50 as well as the bolts 35 by which the housing 34 is secured to the tractor body, all these parts may be removed or replaced as a unit. Consequently the proper location of the actuating rock shaft 31 with respect to the length of the pitman 38, the length of the arm 37, and the position of the crank 51 when in a lifted position, to give the proper over-center relationship between the pitman and the crank, is always preserved undisturbed when the unit is removed or replaced. Preferably the housing 34 is provided with a side opening covered by a removable cover plate 63, so that access may readily be had to the interior of said housing and the mechanism therein.

In the arrangement shown in Figures 5 to 7 in which the power lift attachment is arranged to be applied to the usual opening 64 at the rear of the tractor body, or of its rear axle housing, a power take-off shaft 65 extends rearwardly through said opening, and in the illustrated construction is provided with a worm 66. This shaft may be one substituted for a shorter power take-off shaft similarly arranged, as has been suggested in the prior art. In the arrangement shown in Figures 5 to 7 the same type of half revolution clutch mechanism 67 is shown, 68 indicating the clutch disconnecting pawl which, in this instance, extends horizontally over the clutch mechanism and is normally held in operative position by a spring 69. The tripping lever for the pawl 68 is shown at 70. With this arrangement the power lift mechanism is enclosed in a housing 71 that is preferably slightly different in form from the housing 34 shown in the earlier figures, due to the fact that it is attached to the rear portion of the tractor body instead of to a side portion thereof. With this modification, instead of the power lift housing being made in two parts 34, 42, as shown in Figures 3 and 4, it is shown as being unitary, but it may be made in two parts if desired. The lower portion 72 thereof, in which is mounted the power take-off shaft 65, is arranged in alignment with the opening 64, so that the power take-off shaft 65 extends directly through said opening and through the lower portion 72 of the housing 71.

In the arrangement shown in Figures 5 to 7 the power take-off mechanism is located substantially in the center line of the tractor immediately back of the differential housing thereof, and the upper portion of the housing 71 is provided with two laterally extending tubular members 73, 74 that extend outward to points beyond the planes of the sides of the tractor body and support and enclose actuating rock shafts 75, 76 having at their outer ends arms 77, 78, respectively, which are thus disposed in planes outside of the planes of the sides of the tractor to receive connecting rods 29 located along the sides of the tractor. At their inner ends these rock shafts have arms 79, 80 that are located within the housing 71 and are connected by a pin 81 with a pitman 82 that corresponds to the pitman 38. The housing members 73, 74 are either cast integral with the housing 71 or are firmly secured thereto, and by extending them laterally as described, they provide maximum bearing support for the rock shafts 75, 76. As shown in Figure 7, the power take-off shaft 65 projects rearwardly beyond the housing 71 so that connection may be made therewith for driving other operating parts.

The housing 71 is secured to the tractor frame by bolts 83, 84, by the removal of which it may readily be disconnected from the tractor, carrying with it the power lift mechanism, including the actuating rock shafts 75, 76, the clutch mechanism, the power take-off shaft 65, and the tripping lever 70, which also is mounted in said housing, as shown in Figure 6. Said housing is provided with a side opening 85 through which access to its interior for any desired purpose may be had.

It is to be understood that the power take-off shaft 65 shown in Figure 7 may be driven from the power plant of the tractor in any suitable way, as, for example, in the manner illustrated in prior Patents Nos. 1,640,642 or 1,872,237, granted to me, in both of which the power take-off shaft extends rearwardly through an opening in the rear axle housing and at its inner end is operatively connected with the power plant of the tractor, to be driven therefrom.

In the arrangement shown in Figures 1 to 4, the seat 62 is shown as being mounted on a support 86 that is attached to the rear of the tractor frame or rear axle housing by bolts 87, but in the arrangement shown in Figures 5 to 7, in which the power lift mechanism is attached to the rear of the tractor frame, the seat 62 is preferably mounted on a support 88 that is secured by bolts 89 to a rearwardly extending arm 90 preferably formed integral with the H-bracket 24 associated with the gear shifting lever 23.

In the arrangement shown in Figures 8, 9 and 10, the half-revolution clutch means is driven from the power take-off shaft through gear reduction means and the lifting rock shaft is actuated by the power lift clutch mechanism through overload release linkage. Referring now particularly to these figures, the tractor, indicated in its entirety by the reference numeral 10a, embodies a banjo type rear axle 90 having a rear flanged opening 91 of more or less conventional construction and adapted, when no power lift mechanism is associated with the tractor, to be closed by a cover plate attached in any suitable manner to the flanged opening 91. In the embodiment of my invention shown in these figures, the usual cover plate is replaced by a power lift housing indicated in its entirety by the reference numeral 92. Preferably, the housing 92 is arranged to be fixed in position on the tractor by screws 93 which may also be employed in holding the conventional cover plate in position. The rear axle 90 includes axle shafts 94 which, at their inner ends, have axially spaced main driving gears 95 and 96 fixed thereto. The lower portion of the housing is provided with longitudinally spaced bearing means 98 for receiving and supporting a power take-off shaft 99 which may, if desired, be of substantially the same form as the power take-off shaft 65 shown in Figure 7. The power take-off shaft 99 is provided with a worm 100 which meshes with and serves to drive a worm wheel 101 that forms a part of a double gear element 102, best shown in Figure 10. The double gear element 102 includes a hub section 103 and a spur pinion 104, and is journaled on a fixed shaft 106 which is held in position by a set screw 107 in a pair of apertured ears 109 and 110, preferably formed integral with the housing 92, which extend inwardly so as to position the worm gear well within the space between the drive gears 95 and 96. In axial alignment with the fixed shaft 106, the housing 92 carries apertured bosses 114 and 115 which receive, respectively, screw plugs 116 and 117. These plugs provide for the insertion and removal of the fixed shaft 106. The portion of the housing 92 in the vicinity of the worm wheel 101, integral supporting ears 109 and 110 and associated parts, is extended, as at 92a in Figure 10, to provide a space for receiving the worm wheel 101 and the associated half revolution clutch mechanism which is indicated in its entirety in Figures 8 and 9 by the reference numeral 120.

The half revolution clutch means 120 includes a spur gear element 121 which meshes with the pinion 104 and which is partially disposed between the drive gears 95 and 96. By virtue of this construction and the disposition of the worm gear 101, a very compact power lift unit, which does not overhang rearwardly any great amount, is provided. The gear 121 constitutes the constantly rotating element of the half-revolution clutch 120 and is mounted for rotation upon a transversely disposed crank shaft 124, as by suitable bushing means 125. The crank shaft 124 is provided with a reduced end 126 supported by bushing means 127 in a boss 128 formed on the extension 92a of the housing 92. At the other side of the extension portion 92a the housing 92 is provided with a laterally directed sleeve section 130 which receives bushings 131 and 132. These bushings support the portion of the crank 124 opposite the reduced end 126, and the laterally outer end of the sleeve extension 130 is closed by suitable lubricant sealing means 135. The end of the crank shaft 124 extending laterally outwardly of the sleeve section 130 carries a crank 136 having a crank pin 137.

The driven member of the clutch mechanism 120 is indicated at 140 in Figure 8, and is splined and pinned onto the crank shaft 124 adjacent the reduced end 126 thereof. The driven member 140 is adapted to be optionally connected with the constantly rotatable clutch member 121 through the usual dog mechanism 141 (Figure 9) controlled by a latch 143 mounted upon the shaft 144 journaled for rocking movement in the casing or housing extension 92a. One end of the shaft 144 extends outwardly and carries an arm 145 (Figure 8) connected by means of a link 146 with a trip pedal or lever 147, the latter being mounted by means of a pin 148 for rocking movement upon the upper portion of the housing 92, as best shown in Figure 9.

The upper portion of the housing 92 is formed in a manner similar to the construction illustrated in Figures 5, 6 and 7. The upper portion of the housing carries laterally directed sleeve sections 152 and 153 which receive the bearings by which a power lift rock shaft 154 is journaled. The lifting rock shaft 154 is provided with ends 155 and 156 which are polygonal and which are adapted to receive lifting connections, such as the arms 77 and 78 and the links 29 shown in Figure 6. It is to be understood, of course, that any other form of suitable lifting connections may be mounted at either or both ends of the lifting rock shaft 164. The end 156 of the lifting rock shaft also carries an arm 160 securely fixed thereto in any manner desired laterally outwardly of the end of the associated sleeve section 153. The arm 160 carries a crank pin 161 which is operatively connected with the crank pin 137 of the crank shaft 124 through any suitable form of overload release mechanism 163. For example, the overload release mechanism 163 may take the form shown in my prior Patent No. 1,997,765, issued April 16, 1935.

As will be apparent from Figure 9, the clutch mechanism 120 is of the half revolution type, that is, whenever the pedal 147 is depressed the latch 143 is released and the dog mechanism 141 connects the driven clutch member 140 with the constantly rotating driving member 121. Since the driven clutch part 140 is fixed to the crank shaft 124, the latter will be rotated a half-revolution, or until the dog mechanism is released, as by the return of the latch lever 143 to its normal position. The interposition of gear reduction means between the power take-off shaft 99 and the constantly rotating gear 121 serves the very important purpose of reducing the speed ratio between the worm and worm gear, thereby not only permitting the use of a more efficient angle on the worm gear but also reducing wear at this point. The overload release mechanism is disposed exteriorly so as to provide for convenient inspection and adjustment if necessary. Inspection of the overload release mechanism at intervals is desirable so that the operator will be assured that the power lift clutch and associated mechanism are adequately protected.

While I have described above the preferred embodiments, it is to be understood that my invention is not to be limited to the specific details shown and described above, but that, in fact, widely different means may be employed in the practice of the broader aspects of my invention.

What I claim, therefore, and desire to secure by Letters Patent is:

1. A unitary power lift attachment for tractors comprising a detachable housing adapted to be fixedly secured to the tractor body, an actuating rock shaft mounted on and extending into said housing for application to or removal from the tractor therewith, intermediate power lift actuating mechanism mounted within said housing, an operating connection within said housing between said intermediate mechanism and said rock shaft, and an operating connection for driving said intermediate mechanism from the tractor driving means.

2. A unitary power lift attachment for tractors comprising a detachable housing adapted to be fixedly secured to the tractor body, an actuating rock shaft extending into and journaled in suitable bearings carried by said housing for application to or removal from the tractor therewith, intermediate power lift actuating mechanism mounted within said housing, an operating connection within said housing between said intermediate mechanism and said rock shaft, and a power take-off shaft in said housing arranged to drive said intermediate mechanism and to be driven from the tractor driving means.

3. A unitary power lift attachment for tractors comprising a housing composed of separable housing members adapted to be fixedly secured to the tractor body, an actuating rock shaft mounted in suitable bearings in one of said members for application to or removal from the tractor therewith, intermediate power lift actuating mechanism mounted in the member of said housing that carries said rock shaft, an operating connection within said housing between said intermediate mechanism and said rock shaft, and a power take-off shaft mounted in the other member of said housing arranged to drive said intermediate mechanism and to be driven from the tractor driving means.

4. The combination with a tractor including a motor for driving the same, of a unitary power lift attachment comprising a detachable housing adapted to be fixedly secured to the tractor body, an actuating rock shaft mounted on and extending into said housing for application to or removal from the tractor therewith, intermediate power lift actuating mechanism mounted within said housing, an operating connection within said housing between said intermediate mechanism and said rock shaft, and means supported by said housing for connecting said intermediate mechanism with the tractor driving means.

5. The combination with a tractor including a motor for driving the same, of a detachable housing adapted to be fixedly secured to the tractor body and comprising separable members, an actuating rock shaft mounted on and extending into one portion of said housing for application to or removal from the tractor therewith, intermediate power lift actuating mechanism mounted in the portion of said housing that carries said rock shaft, an operating connection within said housing between said intermediate mechanism and said rock shaft, and a power take-off shaft mounted in the other portion of said housing and operatively connected with said intermediate mechanism, said power take-off shaft extending into the tractor body and operatively connected with said motor.

6. A unitary power lift attachment for tractors comprising a detachable housing adapted to be fixedly secured to the tractor body, power lift actuating mechanism mounted within said housing, an operating connection in said housing for separably connecting said power lift actuating mechanism to the tractor driving means, power lift means in and extending out of said housing, and an operating connection within said housing between said power lift means and said power lift actuating mechanism, the latter operating connection, together with said power lift means and said power lift actuating mechanism, being supported in predetermined operative relation to each other by the housing, and being unitarily applicable therewith to or removable from the tractor.

7. A unitary power lift attachment for tractors comprising a detachable housing adapted to be fixedly secured to the tractor body, said housing having oppositely disposed members extending laterally beyond the planes of the sides of the tractor body, an actuating rock shaft supported in bearings on said members and having operating connections beyond the ends of said members, said rock shaft being applicable to or removable from the tractor with said housing, as a unit, intermediate power lift actuating mechanism mounted within said housing, an operating connection within said housing between said intermediate mechanism and said rock shaft, and an operating connection for driving said intermediate mechanism from the tractor driving means.

8. A unitary power lift attachment for tractors comprising a detachable housing adapted to be fixedly secured to the tractor body, an actuating rock shaft mounted on and extending into said housing for application to or removal from the tractor therewith, intermediate power lift actuating mechanism mounted within said housing, an operating connection within said housing between said intermediate mechanism and said rock shaft, an operating connection for driving said intermediate mechanism from the tractor driving means, and a control lever mounted on and removable with the housing.

9. A power lift attachment for tractors, comprising a housing adapted to be fixedly and detachably secured to the tractor body at one side thereof, an actuating rock shaft mounted in said housing and disposed transversely of the tractor body, said rock shaft being removable from the tractor with said housing, and having a separable lateral extension supported on the opposite side of the tractor body, intermediate power lift actuating mechanism mounted within said housing, an operating connection within said housing between said intermediate mechanism and said rock shaft, and an operating connection for driving said intermediate mechanism from the tractor driving means.

10. A unitary power lift attachment for tractors comprising a detachable housing adapted to be fixedly secured to the tractor body, said housing having oppositely disposed sleeve members extending laterally to a point adjacent the longitudinal vertical planes of the sides of the tractor body, an actuating rock shaft journaled in said sleeve members and having operating connections beyond the ends of said members, intermediate power lift actuating mechanism disposed within said housing, an operating connection extending between said intermediate mechanism and said rock shaft, a control lever for said mechanism mounted on said housing, said rock shaft, said operating connection and said control lever being applicable to or removable from the tractor with said housing, as a unit, and an operating connection for driving said intermediate mechanism from the tractor driving means.

11. A unitary power lift attachment for tractors comprising a detachable housing adapted to be fixedly secured to the tractor body, said housing having oppositely disposed sleeve members extending laterally outwardly beyond the planes of the sides of the tractor body, an actuating rock shaft journaled in said sleeve members and having operating connections beyond the ends of said members, intermediate power lift actuating mechanism disposed within said housing, an operating connection extending between said intermediate mechanism and said rock shaft, a control lever for said mechanism mounted on said housing, said rock shaft, said operating connection and said control lever being applicable to or removable from the tractor with said housing, as a unit, and an operating connection for driving said intermediate mechanism from the tractor driving means.

12. A unitary power lift attachment for tractors comprising a detachable housing adapted to be fixedly secured to the tractor body, said housing having oppositely disposed members extending laterally from the upper portion thereof to points adjacent the longitudinal vertical planes of the sides of the tractor body, an actuating rock shaft supported in bearings on said members and extending laterally outwardly of the ends of said members, said rock shaft carrying operating connections at its ends beyond the ends of said members and adjacent said planes and said rock shaft being applicable to or removable from the tractor with said housing, as a unit, intermediate power lift actuating mechanism mounted within said housing below said laterally extending members, an operating connection carried by and removable with said housing and extending between said intermediate mechanism and said rock shaft, and means in the lower portion of said housing for driving said intermediate mechanism from the tractor driving means.

13. A unitary power lift attachment for tractors comprising a detachable housing adapted to be fixedly secured to the tractor body, said housing having oppositely disposed members extending laterally to points adjacent the longitudinal vertical planes of the sides of the tractor body, an actuating rock shaft supported in bearings on said members and having operating connections beyond the ends of said members and adjacent said planes, said rock shaft being applicable to or removable from the tractor with said housing as a unit, intermediate power lift actuating mechanism mounted within said housing, overload release means serving to connect said intermediate mechanism and said rock shaft, and means for driving said intermediate mechanism from the tractor driving means.

14. A unitary power lift attachment for tractors comprising a detachable housing adapted to be fixedly secured to the tractor body, said housing having oppositely disposed members extending laterally to points adjacent the longitudinal vertical planes of the sides of the tractor body, an actuating rock shaft supported in bearings on said members and having operating connections beyond the ends of said members, said rock shaft being applicable to or removable from the tractor with said housing, as a unit, intermediate power lift actuating mechanism mounted within said housing and including a shaft member extending in parallelism with respect to said rock shaft and extending to a point outside said housing, an operating connection between the outer end of said shaft member and one end of said rock shaft for operatively connecting the latter with said intermediate mechanism, and means for driving said intermediate mechanism from the tractor driving means.

15. A unitary power lift attachment for tractors comprising a detachable housing adapted to be fixedly secured to the tractor body, said housing having oppositely disposed members extending laterally from the upper portion of said housing to points adjacent the planes of the sides of the tractor, an actuating rock shaft supported in said members and extending laterally outwardly thereof at each side of the tractor, said rock shaft being applicable to or removable from the tractor with said housing as a unit, intermediate power lift actuating mechanism mounted within said housing below said members and including half revolution clutch mechanism and gear reduction means for driving the same, an operating connection between said half revolution clutch mechanism and said rock shaft, and means for driving said clutch mechanism including a worm shaft operatively connected to actuate said gear reduction means.

16. A unitary power lift attachment for tractors comprising a detachable housing adapted to be fixedly secured to the tractor body, an actuating rock shaft mounted on and extending into said housing for application to or removal from the tractor therewith, intermediate power lift actuating mechanism mounted within said housing and including a transverse shaft adapted to be intermittently operated, a second transverse shaft, a pair of apertured parts carried upon the rear wall of said detachable housing for supporting said second transverse shaft, an operating connection between said first transverse shaft and said rock shaft, and operating connections mounted on said second transverse shaft for driving said intermediate mechanism from the tractor driving means.

17. A unitary power lift attachment for tractors comprising a detachable housing adapted to be fixedly secured to the tractor body, an actuating rock shaft mounted on said housing for application to or removal from the tractor with the housing, intermediate power lift actuating mechanism mounted within said housing and including a transverse shaft and a constantly rotatable member journaled for rotation thereon, means on the rear wall of said housing for supporting said transverse shaft, an operating connection between said last named shaft and said rock shaft including accessible overload release mechanism disposed exteriorly of said housing, and means for driving said intermediate mechanism from the tractor driving means including a worm shaft journaled for rotation in the lower portion of said housing, and gear reduction means operatively connecting said worm shaft with said constantly rotatable member.

18. A unitary power lift attachment for tractors comprising a detachable housing adapted to be fixedly secured to the tractor body, an actuating rock shaft mounted on said housing for application to or removal from the tractor therewith, intermediate power lift actuating mechanism mounted within said housing below said rock shaft and including a transverse shaft journaled for rotation in said housing and a constantly rotatable member journaled for rotation on said shaft, an operating connection between the outer end of said transverse shaft and one end of said rock shaft, a fixed shaft carried by said housing below said transverse shaft, and means for driving said power lift actuating mechanism including a worm shaft and gear reduction mechanism mounted on said fixed shaft and meshing with said constantly rotatable member.

19. A unitary power lift attachment for tractors comprising a detachable housing adapted to be fixedly secured to the tractor body, an actuating rock shaft mounted on said housing for application to or removal from the tractor therewith, intermediate power lift actuating mechanism mounted within said housing below said rock shaft and including a transverse shaft journaled for rotation in said housing and a constantly rotatable member journaled for rotation on said shaft, an operating connection between the outer end of said transverse shaft and one end of said rock shaft, and means for driving said intermediate mechanism from the tractor driving means including a longitudinally disposed worm shaft journaled for rotation in said casing, a fixed shaft carried on the rear wall of said housing, and gear reduction means including a compound gear member driven from said worm shaft and a member meshing with said constantly rotating member.

20. In a tractor having a rear axle housing provided with a rearwardly facing central opening and enclosing a pair of laterally spaced drive gears, power lift mechanism comprising a vertically arranged housing adapted to be secured to said axle housing over said rearwardly facing opening and partially embracing said drive gears, a power lift rock shaft journaled for rocking movement in the upper portion of said power lift housing substantially above the rear portions of said drive gears, power lift mechanism disposed within said housing and including gear reduction members disposed in a position between and parallel with respect to the planes of said spaced drive gears, and means disposed in the lower portion of said housing for driving certain of said gear reduction members.

21. In a tractor having a rear axle housing provided with a rearwardly facing central opening and enclosing a pair of laterally spaced drive gears, a vertically arranged housing adapted to be secured to said axle housing over said rearwardly facing opening and partially embracing said drive gears, a power lift shaft journaled in the upper portion of said power lift housing adjacent the rear portions of said drive gears, power lift mechanism disposed within said housing operatively connected to actuate said power lift shaft and including gear reduction members disposed in a position between and parallel with respect to the planes of said spaced drive gears, and means disposed in the lower portion of said housing for driving certain of said gear reduction members.

22. In a tractor having a rear axle housing provided with a central opening and enclosing a pair of laterally spaced drive gears, a power lift housing adapted to be secured to said axle housing over said opening and partially embracing said drive gears, a power lift shaft journaled in said power lift housing adjacent said drive gears, power lift mechanism disposed within said housing operatively connected to actuate said power lift shaft and including gear reduction members disposed in a position between and parallel with respect to the planes of said drive gears, and means disposed in said rear axle housing for driving certain of said gear reduction members.

23. A unitary power lift attachment for tractors comprising a detachable housing adapted to be fixedly secured to the tractor body, said housing having oppositely disposed members extending laterally to a point adjacent the longitudinal vertical planes of the sides of the tractor body, an actuating rock shaft supported in bearings on said members and having operating connections beyond the ends of said members, intermediate power lift actuating mechanism mounted within said housing and operatively connected within said housing to said rock shaft, said rock shaft and said intermediate power lift actuating mechanism being applicable to or removable from the tractor with said housing as a unit, and an operating connection for driving said intermediate power lift actuating mechanism from the tractor driving means.

24. A unitary power lift attachment for tractors comprising a detachable housing adapted to be fixedly secured to the tractor body, said housing having oppositely disposed members extending laterally to a point adjacent the longitudinal vertical plane of the sides of the tractor body, an actuating rock shaft supported in bearings on said members and having operating connections beyond the ends of said members, intermediate power lift actuating mechanism mounted within said housing and operatively connected within said housing to said rock shaft, power take-off means for driving said intermediate mechanism operatively connected to the tractor driving means, said rock shaft, said intermediate power lift actuating mechanism, and said power take-off means being applicable to or removable from the tractor with said housing, as a unit.

25. A unitary power lift attachment for tractors comprising a detachable housing adapted to be fixedly secured to the tractor body, said housing having oppositely disposed sleeve members extending laterally to a point adjacent the longitudinal vertical planes of the sides of the tractor body, an actuating rock shaft journaled in said sleeve members and having operating connections beyond the ends of said members, intermediate power lift actuating mechanism disposed within said housing and operatively connected with said rock shaft, a control lever for said mechanism mounted on said housing, said rock shaft, said intermediate power lift actuating mechanism and said control lever being applicable to or removable from the tractor with said housing, as a unit, and an operating connection for driving said intermediate mechanism from the tractor driving means.

THEOPHILUS BROWN.